(12) United States Patent
Clement

(10) Patent No.: US 11,124,973 B2
(45) Date of Patent: Sep. 21, 2021

(54) BOARD AND METHOD FOR MANUFACTURING A BOARD

(71) Applicant: UNILIN, BV, Wielsbeke (BE)

(72) Inventor: Benjamin Clement, Waregem (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 16/651,519

(22) PCT Filed: Sep. 26, 2018

(86) PCT No.: PCT/IB2018/057461
§ 371 (c)(1),
(2) Date: Mar. 27, 2020

(87) PCT Pub. No.: WO2019/064201
PCT Pub. Date: Apr. 4, 2019

(65) Prior Publication Data
US 2020/0263438 A1    Aug. 20, 2020

Related U.S. Application Data

(63) Continuation of application No. PCT/IB2018/051903, filed on Mar. 21, 2018.
(Continued)

(30) Foreign Application Priority Data

Mar. 21, 2018    (WO) .................. PCT/IB2018/051903

(51) Int. Cl.
*E04B 2/00* (2006.01)
*E04F 15/02* (2006.01)
(Continued)

(52) U.S. Cl.
CPC ...... *E04F 15/02038* (2013.01); *E04F 15/107* (2013.01); *B32B 7/12* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 6,006,486 A * 12/1999 Moriau .................. F16B 5/008
                                                           52/589.1
6,235,367 B1    5/2001 Holmes et al.
(Continued)

FOREIGN PATENT DOCUMENTS

EP    0206832 A2    12/1986
EP    1813425 A2    8/2007
(Continued)

OTHER PUBLICATIONS

International Search Report & Written Opinion from PCT Application No. PCT/IB2018/051903, dated Dec. 20, 2018.
(Continued)

*Primary Examiner* — Chi Q Nguyen
(74) *Attorney, Agent, or Firm* — Workman Nydegger

(57) ABSTRACT

A board consisting at least of a substrate formed at least of a gypsum-based and/or cement-based basic material layer. The board is provided with a chamfer extending through the basic material layer.

14 Claims, 1 Drawing Sheet

Related U.S. Application Data

(60) Provisional application No. 62/564,719, filed on Sep. 28, 2017.

(51) Int. Cl.
  *E04F 15/10* (2006.01)
  *B32B 7/12* (2006.01)
  *B44C 5/04* (2006.01)

(52) U.S. Cl.
  CPC ..... *B32B 2262/101* (2013.01); *B32B 2471/00* (2013.01); *B32B 2607/00* (2013.01); *B44C 5/04* (2013.01); *E04F 2201/0153* (2013.01)

(58) Field of Classification Search
  CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138
  USPC .. 52/592.1, 592.3, 592.2, 578, 588.1, 309.1, 52/309.3
  See application file for complete search history.

(56) References Cited

U.S. PATENT DOCUMENTS

| | | | | |
|---|---|---|---|---|
| 7,827,749 | B2* | 11/2010 | Groeke | B44C 5/043 52/316 |
| 8,176,698 | B2* | 5/2012 | Lewark | E04F 15/02 52/316 |
| 8,549,807 | B2* | 10/2013 | Meersseman | B32B 37/16 52/313 |
| 8,617,690 | B2 | 12/2013 | Eisermann | |
| 9,828,777 | B2 | 11/2017 | Dohring | |
| 2003/0033777 | A1 | 2/2003 | Thiers et al. | |
| 2007/0207296 | A1 | 9/2007 | Eisermann | |
| 2009/0000232 | A1* | 1/2009 | Thiers | E04F 15/02166 52/588.1 |
| 2009/0130377 | A1 | 5/2009 | Samanta et al. | |
| 2009/0193741 | A1* | 8/2009 | Cappelle | E04F 15/102 52/309.1 |
| 2009/0249731 | A1* | 10/2009 | Cappelle | E04F 15/02033 52/588.1 |
| 2009/0260313 | A1* | 10/2009 | Segaert | B27M 1/00 52/592.1 |
| 2009/0320402 | A1* | 12/2009 | Schacht | E04F 15/04 52/588.1 |
| 2013/0104478 | A1* | 5/2013 | Meersseman | B32B 3/06 52/309.1 |
| 2013/0104485 | A1* | 5/2013 | Meersseman | B32B 3/06 52/578 |
| 2013/0126066 | A1 | 5/2013 | Eisermann | |
| 2015/0233127 | A1 | 8/2015 | Dohring | |
| 2015/0337542 | A1* | 11/2015 | Cappelle | E04F 15/02038 52/309.13 |
| 2016/0375674 | A1* | 12/2016 | Schulte | B32B 37/12 156/220 |
| 2018/0119429 | A1* | 5/2018 | Schulte | E04F 15/02038 |
| 2018/0195291 | A1* | 7/2018 | Loncke | B32B 21/08 |
| 2018/0258651 | A1* | 9/2018 | Meersseman | B32B 27/30 |

FOREIGN PATENT DOCUMENTS

| | | |
|---|---|---|
| WO | WO9747834 A1 | 12/1997 |
| WO | 0175247 A1 | 10/2001 |
| WO | 2007020657 A1 | 2/2007 |
| WO | 2014053186 A1 | 4/2014 |
| WO | 2014108875 A1 | 7/2014 |
| WO | 2018138273 A1 | 8/2018 |

OTHER PUBLICATIONS

International Search Report & Written Opinion from PCT Application No. PCT/IB2018/057461, dated Dec. 20, 2018.

* cited by examiner

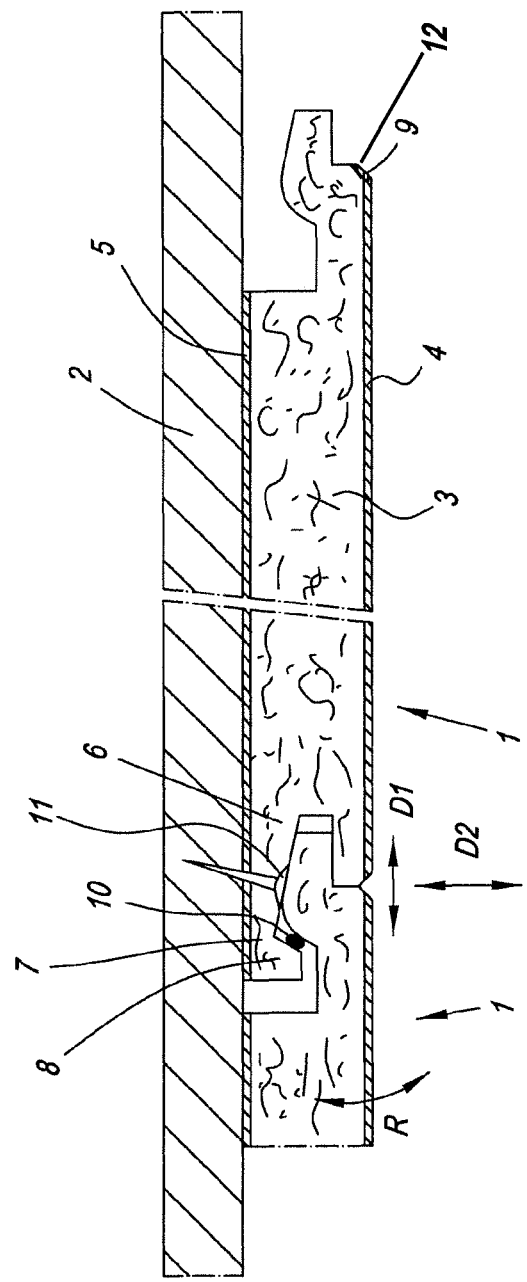

BOARD AND METHOD FOR MANUFACTURING A BOARD

This application claims the benefit under 35 U.S.C. 119(e) to the U.S. provisional applications 62/564,719 filed on Sep. 28, 2017.

BACKGROUND OF THE INVENTION

Field of the Invention

This invention relates to a board and a method of manufacturing such board.

More particularly, the invention relates to a board which is intended for forming a wall, floor or ceiling surface. In other words, this relates to a panel in the form of a wall panel and/or floor panel and/or ceiling panel. More particularly, it relates to such board or panel which is of the type that is intended at least for being applied in interior applications, in other words, for forming a floor covering, wall covering or ceiling covering.

SUMMARY OF THE DISCLOSURE

The invention aims at a board which, on the one hand, offers a good resistance against fire and, on the other hand, is advantageous in respect to production features and production possibilities, as well as in respect to processing.

To this aim, the invention relates to a board as described in the appended claims. Herein, several independent aspects will be covered, which are defined in the form of the appended independent claims.

To this aim, the invention relates to boards as defined in the following numbered paragraphs:

1.—Board, characterized in that it consists at least of a substrate which is formed at least of a gypsum-based and/or cement-based basic material layer with a compressive strength of at least 30 kg/cm² and a resin-based covering provided on at least one side of the substrate, in the form of a laminate layer directly pressed onto the substrate, also named "DPL" (Direct Pressure Laminate).

2.—Board according to paragraph 1, characterized in that the directly pressed laminate layer is a layer which has been pressed with a pressure of more than 25 kg/cm².

3.—Board according to any of the preceding numbered paragraphs, characterized in that the basic material layer has a compressive strength of at least 40 and still better at least 50 kg/cm².

4.—Board according to any of the preceding numbered paragraphs, characterized in that the basic material layer has a compressive strength of at least 70 kg/cm².

5.—Board according to any of the preceding numbered paragraphs, characterized in that the basic material layer has a compressive strength in the order of magnitude of 90 kg/cm² or more.

6.—Board according to any of the preceding numbered paragraphs, characterized in that the directly pressed laminate layer is a layer which has been pressed with a pressure of more than 30 kg/cm² and still better of more than 35 kg/cm², and that the compressive strength of the board is higher than that value.

7.—Board according to any of the preceding numbered paragraphs, characterized in that the basic material layer is a so-called highly compacted gypsum and/or cement board.

8.—Board according to any of the preceding numbered paragraphs, characterized in that the basic material layer contains reinforcement material, such as reinforcement fibers, and preferably consists of a gypsum fiber board or fiber cement board, and more particularly of a highly compacted gypsum fiber board or highly compacted fiber cement board.

9.—Board according to paragraph 8, characterized in that the fibers are present in the basic material layer substantially over the entire thickness of this layer.

10.—Board according to paragraphs 8 or 9, characterized in that the fibers consist of synthetic fibers in general and/or natural fibers in general and/or wood fibers and/or paper fibers and/or carbon fibers and/or glass fibers.

11.—Board according to any of the preceding numbered paragraphs, characterized in that the aforementioned resin-based covering is situated at that side of the board which is intended for forming the front side.

12.—Board according to any of the preceding numbered paragraphs, characterized in that a resin bond is continuously present from on the resin-based covering up into the gypsum-based and/or cement-based material of the basic material layer.

13.—Board according to paragraph 12, characterized in that the resin of said resin bond extends at least up to a depth in said gypsum-based and/or cement-based material which is at least 0.5 millimeters and still better is at least 1 millimeter.

14.—Board according to any of the preceding numbered paragraphs, characterized in that the substrate, at the side on which the resin-based covering is provided, is free from a cover sheet, such that the resin-based covering then is present directly on said basic material layer.

15.—Board according to any of the paragraphs 1 to 13, characterized in that the aforementioned substrate, at least on the side on which the resin-based covering is provided, comprises a cover sheet, which consists of one or more layers of paper or cardboard or consists of another material, and wherein the resin-based covering is provided directly or indirectly on the paper or cardboard layer or other cover sheet.

16.—Board according to paragraph 15, characterized in that the paper or cardboard layer has a thickness smaller than or equal to 0.18 millimeters and still better smaller than or equal to 0.1 millimeter.

17.—Board according to any of the preceding numbered paragraphs, characterized in that the substrate is provided with an adherence-increasing layer, which improves the adherence of the resin-based covering.

18.—Board according to any of the preceding numbered paragraphs, characterized in that the aforementioned resin-based material layer is formed of one or more material sheets pressed by means of resin.

19.—Board according to paragraph 18, characterized in that at least one of the material sheets, and preferably all of them, consists, consist, respectively, of paper.

20.—Board according to paragraph 18 or 19, characterized in that the resin-based material layer is at least formed of one or more resin-impregnated sheets, more particularly paper sheets, which are pressed on the substrate.

21.—Board according to paragraph 20, characterized in that the resin-based material layer is at least composed of one of the following layers, or comprises a combination of any two of the following layers or all three of the following layers:

a sheet impregnated with resin, which sheet functions as a basic or lower layer;

a sheet impregnated with resin, which sheet functions as a decor layer;

a sheet impregnated with resin, which sheet functions as an overlay and preferably is provided with particles which increase the wear resistance, such as corundum.

22.—Board according to any of the preceding numbered paragraphs, characterized in that it is provided with a decor layer, whether or not with a pattern.

23.—Board according to paragraph 22, characterized in that the pattern is a print directly provided on the board, for example, realized by means of a digital printer, for example, inkjet printer.

24.—Board according to any of the preceding paragraphs, characterized in that in the upper side thereof a relief is provided, formed by embossments, preferably realized when compressing the laminate layer.

25.—Board according to any of the preceding paragraphs, characterized in that it shows a pattern as well as embossments in the surface and that the embossments are in register with the image of the pattern.

26.—Board according to any of the preceding paragraphs, characterized in that the resin consists of a thermo-hardening resin, more particularly a melamine resin.

27.—Board, characterized in that it consists at least of a substrate which is at least formed of a gypsum-based and/or cement-based basic material layer with a resin-based covering provided on at least one side of the substrate, in the form of a laminate layer directly pressed onto the substrate, also named "DPL" (Direct Pressure Laminate), wherein the board, on at least two opposite edges, is provided with coupling means allowing to couple two of such boards to each other.

28.—Board according to paragraph 27, characterized in that the coupling means provide at least an overlap of material of the substrate.

29.—Board according to paragraph 27 or 28, characterized in that the coupling means provide at least a tongue and groove profile.

30.—Board according to paragraph 27, 28 or 29, characterized in that the coupling means are configured such that they, in the coupled condition, provide for a locking according to a direction in the plane of the coupled panels and perpendicular to the coupled edges, as well as in a direction perpendicular to the plane of the coupled boards.

31.—Board according to paragraph 32, characterized in that the coupling means are of the type which allows joining by means of turning and preferably comprises a groove with a further-extending rearmost lip, which is provided with a locking element (8).

32.—Board, characterized in that it consists at least of a substrate which is formed at least of a gypsum-based and/or cement-based basic material layer; that the basic material layer is provided with a reinforcement; that the board, on at least two opposite edges, is provided with coupling means which allow coupling two of such boards to each other, which are configured such that they, in the coupled condition, provide for a locking according to a direction in the plane of the coupled panels and perpendicular to the coupled edges, as well as in a direction perpendicular to the plane of the coupled boards; that the coupling means are made substantially or entirely in one piece in the basic material layer; and that the aforementioned reinforcement is present up into the coupling means, wherein the coupling means preferably are of the kind already described.

33.—Board according to paragraph 32, characterized in that the reinforcement is formed by fibers which are present in the material or the cement-based and/or gypsum-based basic material layer, more particularly are blended therein, and thereby thus also in the coupling means made in one piece therewith.

34.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled panels and perpendicular to the coupled edges, as well as in a direction perpendicular to the plane of the coupled boards; that the coupling means are realized substantially or entirely in the board, and more particularly in the basic material layer; and that the board comprises a usage side which is untreated or is provided with a semi-finished covering.

35.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards or panels and perpendicular to the coupled edges, as well as in a direction perpendicular to the plane of the coupled boards; that the coupling means are realized substantially in one piece or entirely in one piece in the basic material layer; and that the board is oblong with a length of at least 2.4 meters, wherein the aforementioned edges which comprise the aforementioned coupling means, are formed by the longitudinal edges, wherein the coupling means preferably are of the kind and form already described earlier.

36.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; that the coupling means are realized substantially in one piece or entirely in one piece in the material of the board, and more particularly in the material of the aforementioned basic material layer; and that the board comprises a useful surface with a surface size of at least 0.5 square meters and still better at least 0.75 square meters, wherein the coupling parts preferably are of the kind and form already described above.

37.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; and that the coupling means are provided with a means or element, more particularly in the form of a material layer and/or material strip, which provides for a sealing and/or for a tensioning force, which presses the panels with a tension, more particularly, so-called pretension, against each other.

38.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; and that the coupling means are provided with a means or element, preferably in the form of a material layer and/or material strip, which provides for a temperature-activatable sealing.

39.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; that the coupling means are realized substantially in one piece or entirely in one piece in the board, and more particularly in the basic material layer; and that in the proximity of the front side of the board, at the corner edge between the front side and at least one, and preferably both of said two edges, a chamfer is present in the form of a bevel or rounding; and that the board comprises a covering or top layer; and that the chamfer preferably extends deeper than the thickness of the covering or top layer and thus extends at least up into the basic material layer, wherein the surface of the chamfer does or does not comprise a covering, preferably a separate covering. Such chamfer is particularly useful with thin top layers, thinner than 1 or 2 mm, as then, due to the chamfer, the risk of splitting and delamination at the edges is minimized, which otherwise is a real risk with thin top layers. In particular in combination with a covering of said DPL, or panels, which, as aforementioned, are provided with DPL, this is of importance. Also, herein improved effects are obtained when, as will be described below, fillers and/or fibers are applied, which preferably then in fact are present up to against the underside of the top layer, or at least up to a distance of less than 1 mm underneath/behind the top layer.

40.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide at least for a locking in a direction perpendicular to the plane of the coupled boards, preferably by means of a tongue and groove; that the coupling means are realized substantially or entirely in one piece in the basic material layer; and that the groove is bordered by a foremost lip and a rearmost lip, wherein the rearmost lip, distally seen, extends farther than the foremost lip, and wherein the rearmost lip is nailable and/or screwable and/or comprises appliances for facilitating the nailing and/or screwing, and/or is configured such that the board can be attached with the lower lip by means of a clip against an underlying surface or underlying structure.

41.—Board according to paragraph 40, characterized in that coupling means, as described before, are applied.

42.—Board according to any of the preceding numbered paragraphs, characterized in that the cement-based and/or gypsum-based basic material layer is formed of a substance bonding by means of a liquid, more particularly by hardening a gypsum-based and/or cement-based mass.

43.—Board according to any of the paragraphs 1 to 41, characterized in that instead of a cement-based and/or gypsum-based basic material layer, use is made of another mineral-based composed material and/or of a geopolymer.

Further, it is so that with cement-based boards, at least two issues manifest themselves.

A first problem is that these boards absorb moisture, water, respectively, due to the porosity of the board and due to capillary effect. Moreover, cement-based boards in their normal quality are very alkaline. They comprise many salts and, when taking in moisture and subsequently drying out, there is a migration of alkaline water and salts. In the case of façade boards, for which cement-based boards are often used, the cement-based substrate of the board is coated at the rear and upper sides with a lacquer or paint which is not 100% water-impervious, and there is natural ventilation, such that no issue will occur. In the case one wants to apply cement-based boards in a floor covering, more particularly a floor covering which is floatingly installed, wherein these boards are provided at the edges with mechanical coupling parts, such as milled coupling profiles, for coupling them to each other, such board, possibly on both sides, thus, the upper side and the underside, shall be provided with a covering which offers the necessary resistance against wear resistance and water absorption. As a result of the fact that such cement-based boards made as floor panels are lying on the subfloor, as well as due to the fact that such coverings will be present, no significant ventilation of the cement-based substrate can occur. The board can absorb moisture via the milled coupling profiles, and when drying, the alkaline water and the salts slowly will damage the primer, which finally leads to the covering coming loose.

A second problem is that standard cement-based boards have a relatively small internal bond. A standard cement-based board actually is systematically composed of various thin layers, which is a feature of the Hatschek production process mostly applied therewith. This results in a relatively small internal bond, such that it is not evident to consider such standard cement-based board as a floor panel, wall panel or ceiling panel, at least not when edges or profiles have to be provided thereon by a machining treatment. In fact, the small bond may lead to chipping at the edges. There is also a risk that, as a result of the weak internal bond, after milling of locking coupling means, gaping edges and cracks occur in the locking means, such that the floor is not performant during placement and after installation.

According to various aspects of the invention, herein below a number of solutions are presented, which are described in the numbered paragraphs following herein below:

44.—Board, more particularly a panel in the form of a floor panel and/or wall panel and/or ceiling panel, preferably of the type which is at least intended for interior application, wherein this panel comprises a basic material layer (or substrate) which is cement-based, which basic material layer as such can comprise one or more layers of cement-based basic material, wherein this panel preferably comprises a top layer, which as such can consist of one or more layers and gives a decorative appearance to the panel, and that the panel is provided with means which restrict moisture intake in the basic material layer, and/or with means which improve the internal bond in the basic material layer.

45.—Board, more particularly a panel, according to paragraph 44, characterized in that the aforementioned means which improve the moisture intake in the basic material layer and/or the internal bond in the basic material layer, are present according to at least one of the following possibilities:
  the means are applied at least in the proximity of the front side (or thus upper side in the case of a floor panel) and/or rear side (or thus underside in the case of a floor panel) of the basic material layer, more particularly at the respective surface of the basic material layer and/or directly thereunder;
  the means are applied almost exclusively or exclusively in the proximity of the front side (or thus upper side in the case of a floor panel) and/or rear side (or thus underside in the case of a floor panel) of the basic material layer, more particularly at the respective surface of the basic material layer and/or directly thereunder, whereas the respective means are not or almost not present in the middle of the basic material layer;
  the means are employed over the entire thickness of the basic material layer.

46.—Board, more particularly a panel in the form of a floor panel and/or wall panel and/or ceiling panel, preferably of the type which is at least intended for interior application, wherein this panel comprises a basic material layer (or substrate) which is cement-based, which basic material layer as such can comprise one or more layers of cement-based basic material, wherein this panel preferably comprises a top layer, which as such can consist of one or more layers and gives a decorative appearance to the panel, and that the panel comprises means (by which also provisions can be understood) which result in an improved adherence of the top layer and/or provide a reinforcement and/or lesser moisture intake, and wherein this panel in respect to these means preferably also meets paragraphs 44 and 45, characterized in that the panel shows one or more of the following characteristics (wherein in the case of a combination any not contradictory combination of two or more characteristics has to be considered a possibility according to the invention):
  the aforementioned means are of such a nature that they, at least on or next to a surface of the basic material layer, and preferably at least at the side where a top layer or backing layer is to be provided, seen in the thickness of the panel, provide for a zone which is alkaline-resistant and/or the alkaline resistance of which is improved;
  the aforementioned means are of such a nature that they, at least on or next to a surface of the basic material layer, and preferably at least at the side where a top layer or backing layer is to be provided, a reaction with water from the atmosphere and/or from the basic material layer takes place, (to this aim, for example, a "silres" product from the "Wacker" company can be applied, for example, silres BS1701, which can be applied in pure form and then reacts with the water;
  the aforementioned means make use of a means which enhances hydrophobicity, which means is incorporated into the cement-based basic material layer, preferably at least on or next to the surface thereof;
  the aforementioned means make use of a means which forms a filler and/or matrix of material which is water-impervious and/or water-repellent;
  the aforementioned means provide for the application of a silane- and/or siloxane-containing liquid, more particularly emulsion; (after application of the product, preferably as a coating, a hydrolysis is starting which breaks the emulsion, alcohol is released and a silicone matrix is formed which is water-repellent; herein, everything is alkaline-resistant); to this aim, for example, a product of the "silres" kind of "Wacker" can be applied, for example, in the case of silres BS3003 this can be applied with a 1:5 to 1:15 dilution in water and 0.1-3% of active material (preferably in the order of magnitude of 1%) to the total binder in the basic material layer;
  the means stated in the preceding 5 paragraphs is applied in that it is introduced into the substance, and more particularly wet matter (slurry) of which the cement-based material layer is formed, preferably during a Hatschek process;
  the aforementioned means stated in the first 5 paragraphs is applied via impregnation, more particularly after forming the cement-based basic material layer, for example, after a production according to the Hatschek process;
  the means stated in the preceding paragraph is applied via a coating technique, preferably by means of an excess of product, and/or preferably by means of a roller and more particularly by a twice wet on wet coating;
  the aforementioned means consist in adding so-called metal soaps (for example, Bärlocher products); for example, to this aim use can be made of aluminum/magnesium/calcium/zinc stearate and/or zinc laurate long chain fatty acid tail+metal); preferably, this is added into the wet material mass (slurry paste, for example, at 0.1-1% of dry weight; the addition reduces capillary effect and moisture intake in the board);
  the aforementioned means consist in adding, an additive, respectively, of hydrophobic powder, for example, on the basis of silane or silicone resin (for example, DOW SHP50/60); preferably, it is added into the slurry paste, for example, at 0.1-2%, and preferably 0.25-0.5% of dry weight; this is more performant than stearates and silane/silicone emulsions;
  the aforementioned means consist in adding, an additive, respectively, of silicates with hydrophobic features, for example, Li-silicates; the effect thereof is double. On the one hand, CaOH is reacted away towards CaCO3 and in this manner the board is reinforced and made less sensitive to aging. On the other hand, a water-repellent effect is obtained;

as an alternative for the aforementioned silane, polyurethane is applied, preferably water-based polyurethane, and more particular of the type polyester or polyether, and more particularly polycaprolactone; wherein this polyurethane preferably is applied together with a crosslinker as an adhesion promoter, more particularly a carbodiimide crosslinker; this is particularly useful with a DPL top layer, as such crosslinker will show its advantages best as an adhesion promoter between melamine and fiber cement board;

the aforementioned means consist in the use of a crosslinker, preferably carbodiimide, for forming an improved connection between a fiber cement board and a top layer, more particularly melamine-based top layer;

the aforementioned means (by which products can be understood as well as measures or operations which then offer a result at the product) provide for one of the following possibilities, or a combination thereof:

means which provide for a reduction of the porosity of the basic material layer and/or a reduction of the capillary effect thereof and/or an increase of the density thereof;

the use of cement (in the slurry) with a smaller PSD (Particle Size Distribution), preferably smaller than usual in commercial cement boards;

the use of comparatively more cement than usual in commercial cement boards;

increasing the amount of silica or other pozzolane material in comparison to commercial cement boards;

impregnating the cement-based basic material layer with a low-viscosity dispersion which reinforces the basic material layer or thus board or substrate, for example, by means of acrylate or epoxy or isocyanate; the impregnation may take place by, for example, vacuum and/or pressure;

in the case of a Hatschek process, increasing the interlaminary bond, for example, by processing wetter and applying a Hatschek cylinder or sieve which is somewhat coarser than with the usual techniques (larger surface/mm$^2$) and/or by, for example, applying a binding agent between each cement layer, for example, by spraying;

after the Hatschek process (or any other basic shaping process) and prior to the press and/or prior to hardening, coating and/or impregnating with a thermoplastic-based substance (dispersion); herein, the exothermal reaction of the cement renders the thermoplastic liquid, such that it can penetrate into the entire board, or anyhow at least at the surface thereof, where, for example, the top layer has to be provided; applying one or more of the following chemical products in the basic material layer: acrylic and metacrylic (co)polymers, PVA or EVA polymers, styrene/acrylic acid ester copolymers, silane or siloxane of silicone.

47.—Board according to any of the paragraphs 44 to 46, characterized in that the herein above-mentioned means, and more particularly the therein-applied products which result in hydrophobic features, as far as not contradictory with the preceding, are applied alternatively either by providing them in the mass of the board or thus of the cement-based basic material (in the slurry), or by impregnation and/or by providing them in the form of a pre-primer, or by providing a combination thereof (via this technique, the edges of the panels can be treated as well, in particular the surface of coupling parts formed thereon, in particular milled coupling parts allowing a mechanical locking).

It is clear that according to the invention preferably a top layer provided on the basic material layer is present, which as such can consist of one or more layers.

The panel thicknesses of the finished products can be at choice, however, in the case of floor panels the overall thickness preferably is less than 8 mm and still better less than 6 mm, and possibly even less than 4 mm.

In the case of all embodiments mentioned herein above as well as below and in the claims, in the case of a cement-based basic layer preferably use shall be made of fiber cement, thus "fiber cement board", in Dutch sometimes also called cement fiberboard.

There, where this is not contradictory to the description and claims, the cement-based substance according to the invention may also be replaced by other mineral-based substances, such as, for example, calcium oxide board.

It is noted that the various independent aspects according to the invention can be combined at choice and that all mathematical combinations which do not include any contradictions, have to be considered inventions. Further, it is also possible to detach all characteristics of dependent claims as such from the independent claim to which they refer and to combine them with the characteristics of one or more of the other independent claims, this as far as this does not result in contradictory characteristics. Here, too, all mathematical combinations have to be considered disclosed.

The invention also relates to a method of manufacturing such board, which method can be derived from the composition of the board described in the claims.

Regarding the use of lacquers, paints, coatings and the like, according to the invention preferably use is made of one or more of the following possibilities, wherein this primarily is intended for being applied with cement-based boards, in particular with fiber cement boards:

Backside lacquer:
Water-based PVDC lacquer, for example, Haloflex 202;
UV-curable so-called clearcoat lacquers (as alkali-resistant binder)

Waterbased Preprimer
with solid components of 20-60% and application weight of 20-600 g/m$^2$;
to be applied by brush, roller, spraying, curtain coating and/or impregnation by means of vacuum or pressure;
chosen from the following suitable primers: acrylic and methacrylic (co)polymers, PVA or EVA polymers, styrene/acrylic acid ester copolymers;
the primer comprises hydrophobic additives, for example, so-called metal soaps, fluorinated additives, silanes, siloxanes and the like;
the primer comprises fillers, for example, aluminosilicates, silicates, alkaline-earth metal carbonates, calcium carbonates;
the primer comprises pigments, more particularly alkali-resistant pigments or metal oxides; the primer comprises crosslinkers, for example, isocyanates, silanes and the like, which effect an extra crosslinking with the mineral board;

UV Primer:
  application weight 20-40 g/m² with solid components of 100%; UV acrylic lacquer with alkali-resistant binder;
  UV acrylic resin, preferably with a functional isocyanate group;
  with an addition of a crosslinker, more particularly isocyanates, silanes and the like, or creation of a two-component curing mechanism; it is noted that isocyanate will chemically react with OH, $NH_2$ and other functional groups in the fiber cement board.

UV Sealer:
  application by means of a so-called putty machine, wherein all small openings and gaps are filled, whereby it is made sure that a moisture barrier is created between the fiber cement board and the following layers, for example, white lacquers;
  application weight 20-50 g/m², 100% solids;

Application of Other (Following) Layers:
  UV white lacquer;
  inkjet receiver coating;
  digital print;
  protective anti-abrasive lacquers, which contain, for example, aluminum oxide.

All lacquers preferably are alkaline-resistant, as after installation and during cleaning, there is always a small risk that water, which contains salts of the fiber cement board, can penetrate through the lacquer layers.

The invention, as far as this relates to cement-based boards, more particular fiber cement boards, also relates to boards, more particular panels, which meet well-defined specifications, whereby they are more suitable for interior applications, such deviating from the specifications which commonly are applied for façade boards.

According to the invention, the boards, panels, respectively, then preferably meet one or more of the specifications stated in the following table, wherein combinations at choice are possible. Herein, a comparison is made between the specifications of common fiber cement boards, which usually are applied for exterior façades, and fiber cement boards, of which the specifications now according to the invention are chosen such that they can be usefully applied as floor panels, in particular for interior applications. The boards are also suitable for wall and ceiling applications, considering that those mostly have less strict requirements than floor panels.

|  | Not coated composition as a façade board (prior art) | Not coated board according to the invention for floor application | Coated board according to the invention for floor application |
| --- | --- | --- | --- |
| Density (kg/m³) | 1800-1850 | 1870-2000 | 1870-2000 |
| Tensile strength (N/mm²) | <1.3 | >1.4 and preferably >1.5 | >1.4 and preferably >1.5 |
| Pull-off strength (N/mm²) | <1.5 | >1.6 and preferably >1.8 | >1.6 and preferably >1.8 |
| 24 h H2O absorption | 5-10% | <5%, preferably <3%, and still better <1.5% | <5%, preferably <3%, and still better <1.5% |
| max. H2O absorption | +13% and can go to +25% | <11%, preferably <10%, and still better <8% | <6%, preferably <3%, and still better <1.5% |
| Dimensional stability | +/−0.25-0.5% | <+/−0.15%, and better <+/−0.1% | <+/−0.05%, and better <+/−0.04% |
| Delta thickness tolerance for panel of 6 mm | 0.25-0.6 mm | <0.2 mm and preferably <0.1 mm | <0.2 mm and preferably <0.1 mm |

It is noted that according to the invention each criterion mentioned in the above table has to be considered separately as inventive idea, thus, each criterion from one box of the table, as well as any possible combination of two or more criteria.

It is also clear that the absorption is expressed in percent by weight, thus, the increase in weight of the board before and after the H2O absorption.

It is clear that, when determining the aforementioned absorption, it is started from a dry or approximately dry board, in other words, a board which, apart from the chemically bound moisture, comprises no or approximately no vaporable moisture. It is preferred that in practice herein it is started from an air-dried panel, wherein the air-dried condition is obtained by drying the board in an oven at 105° C., with suction, such during 3 days. The H2O absorption then is measured by placing the board in water, such as tap water, such during 24 hours for the "24 h absorption" and during a considerably longer time for the "max. H2O absorption", by which is meant up to a condition in which the water absorption curve is approximately flat. Practically, to this aim 3 days can be chosen at atmospheric pressure.

Preferably, the boards according to the invention indeed are subjected to a grinding treatment before providing them with a covering.

The following criteria can also be applied:

|  | Coated composition as façade board | Coated board according to the invention |
| --- | --- | --- |
| Pull-off and tear strength | Between 10 and 25 | >25, preferably >30 and still better >35 |

One or more of the above-mentioned specifications (specs) of the boards according to the invention thus will preferably be maintained. Primarily, they are substantially intended for boards which have to be provided with lacquer or are provided with lacquer. With any other coverings, too, for example, a melamine layer pressed thereon, it is advantageous to work with boards which meet the specs stated herein above according to the invention.

The application of one or more of the criteria of the invention effect that the boards are particularly suitable for application as floor panels, wall panels and ceiling panels, and the more of the aforementioned criteria are applied, the better the board, the panel, respectively, is for such applications, by which is meant that the board or the panel is more resistant against damages during and after production, undesired deformations and excessive expansion, and/or that the uncoated board is more suitable for forming, starting therewith, a finished product, in other words, more suitable for providing a covering thereon and/or providing coupling means, more particularly horizontally and vertically locking coupling means, herein.

The criteria thus as such already form an invention. It is noted that these criteria may be achieved in any manner, and to this aim all possibilities aforementioned for this purpose can be employed, as well as other possibilities which are within the range of the person skilled in the art.

In order to obtain that the not-coated board fulfills the required criteria, in particular in respect to water absorption and dimensional stability, influence is taken on the composition of the material of the basic material layer, for example, by, as aforementioned, increasing the hydrophobicity of the fiber cement.

In order to obtain that the not-coated board fulfills the required criteria, in particular in respect to water absorption and dimensional stability, either influence can be taken on the composition of the material of the basic material layer, for example, by, as aforementioned, increasing the hydrophobicity of the fiber cement, or influence can be taken on the moisture-proof protection towards the outside, or influence can be taken on both. By "protection towards the outside" is meant that at least on portions of the surface layers of which kind whatsoever are present, which prevent or mitigate moisture penetration and other negative influences. By applying the layers, the basic material layer can be partially or entirely encapsulated such that the water absorption fulfills the intended criteria. The covering layer provided on the decorative side can be realized as an impermeable layer. A possible backing layer also can be realized as an impermeable layer. Finally, if this is necessary in order to achieve one or more of the desired criteria, also the coupling means, mostly the milled locking tongue and locking groove, can be provided with a coating and/or impregnation which reduce and/or exclude the absorption of moisture and water along the edges. To what extent such measures have to be applied, then can be determined by the person skilled in the art via tests, such that the board fulfills the respective criteria required according to the invention.

It is noted that one of the most important criteria from the above table, as well as an independent characteristic, is the fact that the not-coated board fulfills the aforementioned criterion of the low 24 h H2O absorption, in other words, that this is lower than 5%, and preferably is lower than 3% and still better is lower than 1.5%.

Another important criterion from the table, as well as an independent characteristic, is the fact that the coated board, by which the entirely finished panel is meant, fulfills the aforementioned criterion of the low 24 h H2O absorption, in other words, that this is also lower than 5%, and preferably lower than 3% and still better lower than 1.5%.

According to an embodiment the invention also relates to a board, as defined in any of the herein above-described embodiments (from the numbered paragraphs as well as from other described possibilities), more particularly a panel in the form of a floor panel and/or wall panel and/or ceiling panel, preferably of the type which is at least intended for interior application, wherein this panel comprises a basic material layer or substrate which is cement-based, which basic material layer as such can comprise one or more layers of cement-based basic material, wherein one or more of these layers, and preferably the entire basic material layer, preferably is on the basis of fiber cement, wherein this panel comprises a top layer which preferably gives a decorative appearance to the panel, and thus provides in a coating, either lacquer and/or print and/or layer adhered thereto, characterized in that the basic material layer, apart from the cement, also comprises fibers and/or fillers and/or filling agents, preferably additionally to possible process fibers, wherein these fillers and/or fibers preferably consist of synthetic material and/or glass and/or crystalline calcium silicate (including hydrate) and/or xonolite and/or tobermorite and/or inosilicate and/or gyrolite and/or wollastonite and/or sepiolite and/or rhyolite and/or basalt and/or rock wool and/or diabase and/or pumice and/or chalk and/or limestone and/or talc, wherein in the case of application as a particle-shaped filler, this filler preferably comprises particles which are comprised between 1 and 200 microns and/or this filler preferably forms at least 10 percent by weight of the dry cement mixture.

The use of such fillers and/or fibers, more particularly on the basis of the aforementioned materials, has an advantageous effect on the quality of the basic material layer and thus also the quality of the coupling parts realized therein.

Herein, it is further preferred that the board is characterized in that it, on at least one pair of edges, is provided with coupling parts which allow a mutually locking coupling, with a tongue and groove structure or with hook-shaped elements which engage one behind the other, and/or with a separate locking part provided in a seat in an edge, more particularly a locking part which preferably consists of synthetic material, and that the fillers and/or fibers are not only centrally present in the board, but also are present in the tongue structure and/or in the groove structure, by which then the lips are meant which border the groove, and/or in the hook-shaped elements and/or in said seat, by which then the walls are meant which surround the seat.

Further, hereby it is preferred that the tongue structure and/or groove structure and/or hook-shaped elements and/or seat are manufactured by means of a milling treatment and thus comprise milled surfaces.

The presence of the fillers and/or fibers improves the strength of the coupling parts and also allows a better treatment in order to arrive at such coupling parts, amongst others, by milling. The use of wollastonite leads to particularly good results.

It is noted that coupling parts which allow a mutually locking coupling are known as such. An example of coupling parts with a tongue and groove structure in a floor panel is known, amongst others, from FIG. 11 of WO 2014/108875 and from the FIGURES of WO 97/47834. Herein, the coupling parts, according to the present invention, preferably are realized in one piece from the basic material layer. An example of coupling parts with hook-shaped elements which engage behind each other and/or with a separate locking part provided in a seat in an edge, more particularly a locking part which provides in a locking according to a direction perpendicular to the panels, is known from, amongst others, the FIGS. 12, 14, 15 and 16 of WO 2014/108875. An example of integral coupling parts with hook-shaped elements is known from FIG. 7 of WO 01/75247.

These basic forms of coupling parts also have to be understood as incorporated by reference to WO 2014/108875, WO 97/47834 and WO 01/75247.

BRIEF DESCRIPTION OF THE DRAWINGS

FIG. 1 schematically represents a preferred embodiment of such board 1, wherein it is attached as a wall covering board or wall panel against a lath structure 2.

DETAILED DESCRIPTION OF PREFERRED EMBODIMENTS OF THE INVENTION

The basic material layer 3 is a gypsum or fiber cement board. On top of this, a DPL layer 4 is pressed, which as such comprises one or more resin-impregnated sheets. Possibly, a counter layer 5 is provided. Compressing usually is performed at an increased temperature.

The coupling means 6 preferably are of the type which locks in two directions D1 and D2, as indicated. Preferably, they are also of the type which allows joining by means of a turning movement R.

As represented, herein preferably use is made of a longer rearmost lip 7, which is provided with a locking element 8.

At the front corner edge a chamfer 9 can be provided.

A preferably strip-shaped element 10, preferably provided at the locking element 8, can result in a pretension and/or result in a seal and/or result in a heat-activatable fire-retarding joint.

A recess 11 offers space for the head of a nail or the like, such that the whole is nailable or screwable.

Of course, the present invention is not limited to the example represented in the FIGURE.

Also, the FIGURE is schematically illustrative for floor panels, wherein then the back side of the represented panel has to be understood as underside. Locking coupling parts and other characteristics, such as chamfers 9 including a covering 12, can be employed analogous in floor panels.

The most intended applications of the invention are floor panels and wall panels. With wall panels, this preferably are room-high panels which are provided with coupling parts at their edges, which edges are to be mounted vertically, said coupling parts being, for example, of the type as represented in the accompanying FIGURE. With floor panels, this preferably relates to smaller panels, which are provided at their four edges with coupling parts allowing a mutual coupling and locking, in order to be able to form, as usual, a so-called floating floor covering. Wall panels of fiber cement have the great advantage to be fire-resistant, whereas floor panels of this material will hardly expand as a result of temperature changes and the like.

The invention also relates to the obtained substrates as such, without these being already finished further by means of top layers or the like.

It is noted that all information comprised in WO 2018/138273 also has to be understood as incorporated in the present application, as alternative possibilities in combination with the herein above-described possibilities of the present application.

According to another preferred embodiment, the coupling parts are provided with a waterproof or moisture-repelling substance.

In a particular embodiment, the invention relates to a board, more particularly a panel in the form of a floor panel and/or wall panel and/or ceiling panel, preferably of the type which is at least intended for interior application, wherein this panel comprises a basic material layer or substrate which is cement-based, which basic material layer as such can comprise one or more layers of cement-based basic material, wherein one or more of these layers and preferably the entire basic material layer preferably is on the basis of fiber cement, wherein this panel comprises a top layer which comprises one or more synthetic material layers, which, at least in their entirety, have a thickness of 0.5 and still better 1 mm. This can be a vinyl-based layer, such as with LVT. In this manner, delamination in the fiber cement is avoided as the top layer then is sufficiently strong.

Alternatively, the top layer can also be a HPL layer glued onto the basic material layer. Such HPL layer provides for a strong surface, and delamination is almost excluded.

The invention claimed is:

1. A board consisting at least of a substrate is formed from a basic material layer based on a material selected from a group consisting of gypsum, cement and geopolymer;
   wherein the board, on at least two opposite edges, is provided with coupling means arranged for coupling two of such boards to each other, said coupling means are configured such that, in a coupled condition, the coupling means provide for a locking according to a direction in a plane of the coupled boards and perpendicular to the coupled edges, and in a direction perpendicular to the plane of the coupled boards;
   wherein the coupling means are realized substantially in one piece or entirely in one piece in the basic material layer; and
   wherein in a proximity of a front side of the board, on a corner edge between the front side and at least one, of said two opposite edges, a chamfer is present, in a form of a bevel or rounding;
   wherein the board comprises a covering or top layer;
   wherein the covering or top layer is thinner than 1 mm; and
   wherein the chamfer extends deeper than a thickness of the covering or top layer and extends at least into the basic material layer from the covering or top layer from the front side of the board, wherein a surface of the chamfer comprises a separate covering from the covering or top layer on the board.

2. The board according to claim 1, wherein the board comprises one or more fillers or fibers.

3. The board according to claim 1, wherein the basic material layer of the substrate is gypsum or cement and has a compressive strength of 30 kg/cm2, and the top layer or covering layer is resin-based and provided on at least one side of the substrate, in a form of a laminate layer directly pressed onto the substrate.

4. The board according to claim 3, wherein the board has at least one of the following characteristics:
   wherein the laminate layer is directly pressed with a pressure of more than 25 kg/cm2;
   wherein the basic material layer has a compressive strength of at least 40 kg/cm2;
   wherein the basic material layer has a compressive strength of at least 70 kg/cm2;
   wherein the basic material layer has a compressive strength in an order of magnitude of 90 kg/cm2 or more.

5. The board according to claim 3, wherein the laminate layer is directly pressed with a pressure of more than 30 kg/cm2, and that the compressive strength of the board is higher than 30 kg/cm2.

6. The board according to claim 1, wherein the basic material layer is formed from gypsum or cement.

7. The board according to claim 1, wherein said covering or top layer is resin-based and a resin bond is continuously present from on the covering up into the basic material layer, wherein the basic material layer is formed from gypsum or cement.

8. The board according to claim 7, wherein the resin of said resin bond extends at least up to a depth in the basic material layer, wherein said depth is at least 0.5 millimeters.

9. The board according to claim 7, wherein the substrate, at the side on which the resin-based covering is provided, is free from a cover sheet, such that the resin-based covering is directly present on said basic material layer.

10. The board according to claim 7, wherein the substrate, at least on a side on which the resin-based covering is provided, comprises a cover sheet, which consists of one or more layers of paper or cardboard or consists of another material, and wherein the resin-based covering is provided directly or indirectly on the paper or cardboard layer or other cover sheet.

11. The board according to claim 1, wherein it is provided with a decor layer, whether or not with a pattern.

12. The board according to claim 11, wherein the pattern is a print directly provided on the board realized by means of a digital printer.

13. The board according to claim 1, wherein said top layer or covering is resin-based, wherein the resin consists of a thermo-hardening resin.

14. The board according to claim 1, wherein it is provided with coupling means which allow coupling two of such boards to each other, which are configured such that they, in the coupled condition, provide for a locking according to a direction in a plane of the coupled boards and perpendicular to the coupled edges, and in a direction perpendicular to the plane of the coupled boards; and that the coupling means are provided with a means or element, more particularly in the form of a material layer or material strip, which provides for a sealing or for a tensioning force, which presses the panels with pretension tension against each other.

* * * * *